No. 815,180. PATENTED MAR. 13, 1906.
H. B. KOEHLER & C. L. BETZ.
GLASS PRESS.
APPLICATION FILED NOV. 26, 1904.
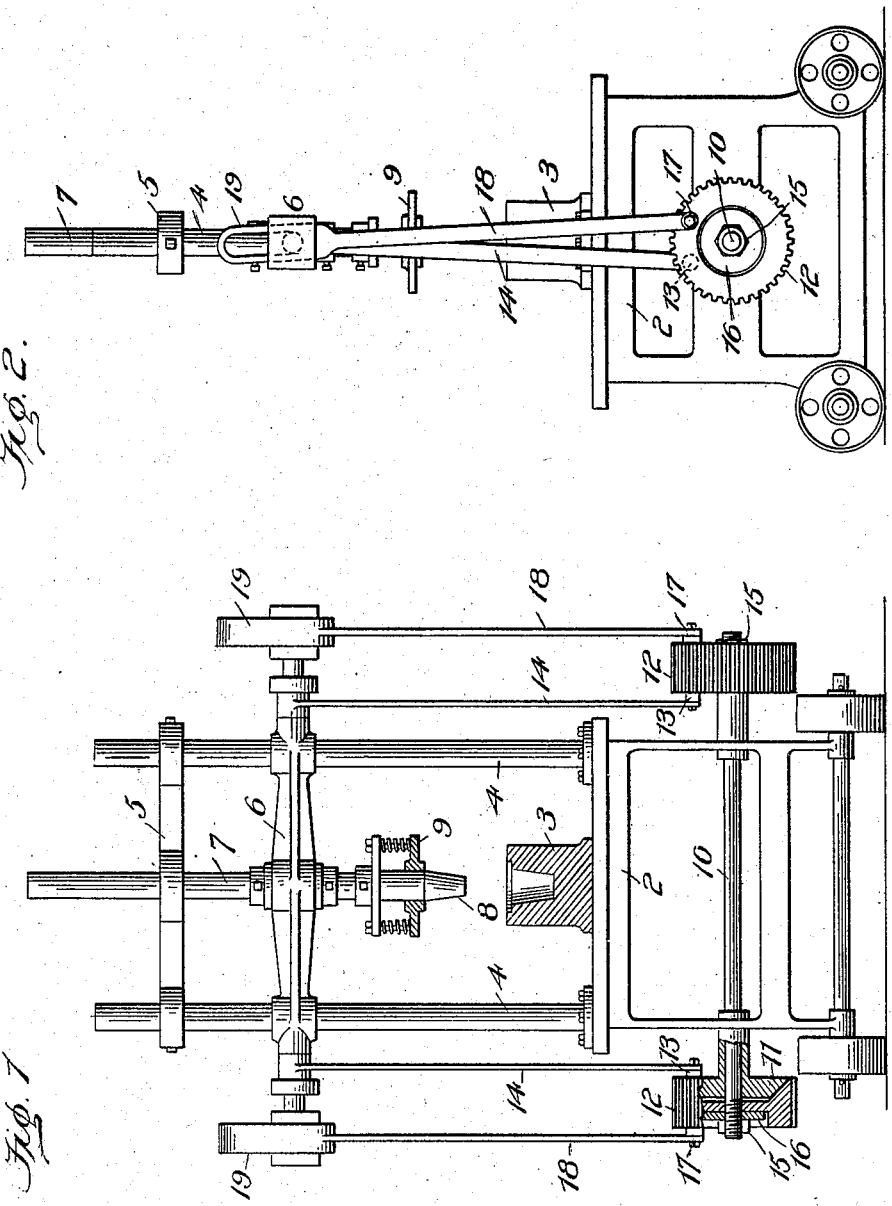

UNITED STATES PATENT OFFICE.

HENRY B. KOEHLER AND CHARLES L. BETZ, OF ROCHESTER, PENNSYLVANIA.

GLASS-PRESS.

No. 815,180.          Specification of Letters Patent.          Patented March 13, 1906.

Application filed November 26, 1904. Serial No. 234,389.

*To all whom it may concern:*

Be it known that we, HENRY B. KOEHLER and CHARLES L. BETZ, citizens of the United States, residing at Rochester, in the county of Beaver and State of Pennsylvania, have invented certain new and useful Improvements in Glass-Presses, of which the following is a specification, reference being had therein to the accompanying drawings.

Our invention relates to presses for molding glass articles of various kinds, particularly those of cup shape, and has for its object to produce a power or motor driven press that will not be strained should too large a mass of glass be placed in the mold, a contingency that is often met with in the operation of apparatus of the kind to which our invention relates, and to secure other advantages, as will be hereinafter pointed out.

Figure 1 is a front elevation of a press embodying our improvements. Fig. 2 is a side view of the same.

The press is mounted upon a wheeled truck 2, on the top of which is supported a mold 3. A framework comprising a pair of uprights 4 and a cross-bar 5 rises from the frame above the mold, and on the uprights of this frame is mounted and reciprocates the cross-head 6. The plunger 8 is connected with the cross-head 6 by means of the rod of shaft 7 and is arranged to enter the cavity in the mold 3 when the cross-head and rod 7 are depressed. A spring-held face-plate 9 surrounds the plunger and gives shape to the edge of the article being molded.

The parts thus far described are of a common and well-known construction, and no claim to novelty is made for any of them.

In the side pieces of the truck there is mounted a rotating shaft 10, near each end of which shaft is mounted the fixed member of a friction device, consisting, by preference, of a cone-shaped friction-wheel 11, keyed to the shaft. With each wheel 11 there coöperates another friction-wheel 12, loosely mounted on the shaft and having a recess shaped to receive and engage with the friction-face of the wheel 11. Each of the wheels 12 is arranged to receive power from any suitable source, they being represented in the drawings as provided with spur-teeth with which driving spur-wheels (not shown) are adapted to engage. Each of the members 11 of the clutch or friction device is provided with a wrist-pin or crank 13, and a connecting-rod 14 extends between this crank or wrist pin and the cross-head 6.

The two clutch members 11 12 are held in frictional engagement by means of suitable clamping devices, which may be of any usual or approved construction. We have represented them as each consisting of a friction-washer 16, arranged between the loose clutch member 12 and a nut 15, mounted upon a screw-threaded portion of the shaft 10. By adjusting the clamping devices we can insure that the two friction members 11 and the connecting-shaft 10 shall turn with the driven friction-wheels 12 until the resistance offered by the engagement of the plunger with the mass of glass inserted in the mold becomes too great, which should be at the instant the glass article is properly molded, after which the wheels 11 and the parts connected therewith will be stopped, the frictional engaging surfaces permitting the driven wheels 12 to continue their movement while the other parts remain stationary.

It will thus be seen that we provide means for preventing the straining of any of the parts of the press should the cut of molten glass inserted in the mold be too great, for as soon as the plunger has entered the mold and the face-plate 9 comes into engagement with the edge of the molded glass the pressure developed will be so great as to cause slipping between the engaging frictional faces of the members 11 12.

When operating presses of this character, it is desirable that the plunger shall remain in the mold and in engagement with the molded article sufficiently long to permit the glass to set. Our press is devised to insure this result. It will be observed that the shaft 10 intersects the vertical plane in which the wrist-pin 13 moves, from which it follows that the wheel 11 cannot make quite a half-revolution from the position occupied by the parts when the plunger is most elevated by reason of the engagement of the rods 14 with the shaft 10. This engagement takes place when the molding operation is completed, assuming that just the right amount of glass has been introduced into the mold-cavity or, if the parts be so adjusted, when a somewhat less amount of glass than is desired is placed in the mold. It will thus be seen that in any event the plunger after having entered the mold and shaped the glass article is stopped and held in engagement with the article while forward movements of the driven parts continue.

In order to withdraw the plunger from the mold, we have devised the following mechanism: 17 is a crank or wrist pin extending outward from the driven member 12 of the clutch. Between this crank or wrist pin and the cross-head 6 extends a connecting-rod or pitman 18, the upper end of which is formed into a loop 19, that surrounds a portion of the cross-head. The radial distance of the crank or wrist pin 17 from the axis of the shaft 10 should be the same as is that of the crank or wrist pin 13, so that when these two pins are in line with each other the movements of the pitmen or connecting-rods 14 and 18 will be synchronous so long as the wheels 11 12 move together. The loop portion 19 of the connecting-rod 18 should be so constructed that when the two wrist-pins 13 17 are in alinement with each other the bottom edge of the bounding-wall of the loop is in engagement with the cross-head 6.

The operation of the apparatus may now be stated, assuming the parts to be in the position indicated in the figures of the drawings—that is, with the plunger raised to its highest point—and that the operator has placed in the mold-cavity 3 a cut of molten glass slightly in excess of that required for making the article being molded. The rotation of the wheels 11 by reason of the frictional engagement therewith of the wheels 12 causes the parts of the machine to be moved forward and the plunger to be inserted into the mold. It will be noticed that as the wheels turn and draw downward the pitmen their movements are synchronous, but that only the pitmen 14 are operating to move the cross-head 6 and its connected parts. As soon as the molding operation is effected, which takes place when the face-plate 9 has given shape to the edge of the article, further movements of the plunger, cross-head, friction-wheels 11, and shaft 10 cease. The wheels 12 will, however, continue to advance, being positively driven from the motor; but while they impart no forward motion to the friction-wheels 11 they operate to hold them, and through them the plunger, in the position these parts occupy when they come to rest. Under the conditions mentioned the arresting of the frictionally-driven parts takes place just before the pitmen 14 come into engagement with the shaft 10. The continued advance of the wheels 12 carries forward the pitmen 18, the loop portions 19 thereof sliding upon the cross-head 6. After the pitmen 18 have passed the shaft 10, which they are free to do, being outside the ends thereof, and have commenced their upward movement the lower ends of the loops 19 come into engagement with the cross-head 6 and being positively driven lift the cross-head and its connected parts to its upmost position. In so doing the pitmen 14 are raised and the wheels 11 and shaft 10 turned backward, the wheels 11 and 12 now turning in opposite directions, until the two wrist-pins 13 17 come in line with each other, which takes place the moment their axes come into the vertical plane of the axis of the shaft 10. Further forward movements of the wheels 12 from this position causes a corresponding forward movement of the wheels 11, when the cycle of movements just described is repeated.

We have illustrated but one method of carrying out our invention, but do not wish to be restricted thereto in its useful applications, as modifications and changes will suggest themselves to those skilled in the art.

What we claim is—

1. In a press adapted for molding glass articles, the combination of a mold, a plunger, means for forcing the plunger into the mold including a friction device arranged to permit a slipping of the parts if the resistance to the forward movement of the plunger becomes too great, and positively-driven means for withdrawing the plunger from the mold, substantially as set forth.

2. In a press adapted to mold glass articles, the combination of a mold, a plunger, power-driven gearing, connections between the plunger and the power-driven gearing, and friction-driven means for causing a dwell or rest of the plunger after it has entered the mold and shaped the article, substantially as set forth.

3. In a molding apparatus adapted to form glass articles, the combination of a mold, a plunger, power-driven gearing, connections between the power-driven gearing and the plunger, including friction members, and means for causing throughout a portion of the cycle of movements of the parts a stoppage of that friction member that is connected with the plunger while the other friction member continues to move with the power-driven gearing, whereby the plunger is caused to come to rest while within the mold, substantially as set forth.

4. In a molding apparatus adapted to form glass articles, the combination of a mold, a reciprocating plunger, power-driven gearing, connections between the power-driven gearing and the plunger for forcing the latter into the mold, including friction members arranged to permit the plunger to come to rest after having entered the mold, and means connected with the power-driven gearing for withdrawing the plunger from the mold, substantially as set forth.

5. In a press, the combination of a mold, a plunger, a cross-head in which the plunger is mounted, two wheels having frictional connection, one being power-driven, a pitman or connecting-rod between one of the wheels and the cross-head for moving the plunger into the mold, and a pitman or connecting-rod between the other wheel and the cross-head for withdrawing the plunger from the mold, substantially as set forth.

6. In a press, the combination of a mold, a plunger, a cross-head in which the plunger is mounted, means for driving the cross-head to force the plunger into the mold and for holding it therein, and other means for moving the said cross-head to withdraw the plunger from the mold and for restoring its driving means to an initial position, substantially as set forth.

7. In a press, the combination of a mold, a plunger, a cross-head in which the plunger is mounted, a wheel, a pitman connecting the wheel and the cross-head, means for turning the wheel to cause the plunger to move into the mold, means for arresting the movement of the wheel, and means for causing a backward movement of the wheel to withdraw the plunger from the mold, substantially as set forth.

8. In a press, the combination of a mold, a plunger, a cross-head in which the plunger is mounted, a pair of wheels mounted upon a common axis, each wheel being connected with the cross-head by an independent connecting-rod, and means for causing one wheel and its connecting-rod to act upon the cross-head to move the plunger into the mold, and for causing the other wheel and its connecting-rod to move the cross-head to withdraw the plunger from the mold, substantially as set forth.

9. In a press, the combination of a mold, a plunger, a cross-head in which the plunger is mounted, a rotary shaft, a wheel mounted on said shaft and provided with a crank-pin, a connecting-rod between such crank-pin and the cross-head, the connecting-rod being so arranged that the plane in which it moves intersects the shaft on which the wheel is mounted, whereby the shaft operates as a stop to arrest the movement of the parts, means for moving the wheel to cause the plunger to enter the mold, such means being arranged to be arrested when the resistance increases beyond a certain amount, and means for restoring the parts to an initial position, substantially as set forth.

10. In a press, the combination of a mold, a cross-head, a plunger carried thereby, a rotary shaft, a pair of wheels mounted on the shaft, one being loose and the other fast relative thereto, the wheels having frictional engaging surfaces, and one being power-driven, a connecting-rod between one of the wheels and the cross-head for moving the plunger into its mold, the connecting-rod being so arranged that its plane of movement intersects the shaft, and another connecting-rod between the other wheel and the cross-head arranged to restore the cross-head, its plunger, the other wheel and its connecting-rod to initial positions, substantially as set forth.

11. In a press, the combination of a cross-head, a plunger, a rotary shaft 10, two wheels 11, 12, mounted thereon, one being fast on the shaft and the other loose, and the wheel 12 being power-driven, means for holding the wheels in frictional engagement with each other, a connecting-rod 14 between the wheel 11 and the cross-head, the connecting-rod being so arranged that its plane of movement intersects the shaft 10, and a connecting-rod 18 between the wheel 12 and the cross-head, the end of this connecting-rod that engages with the cross-head being provided with a loop or slot 19, substantially as set forth.

In testimony whereof we affix our signatures in presence of two witnesses.

HENRY B. KOEHLER.
CHARLES L. BETZ.

Witnesses:
V. B. IRONS,
J. A. IRONS.